United States Patent [19]

Rod et al.

[11] 4,045,314
[45] Aug. 30, 1977

[54] WASTE EVAPORATION DISPOSAL SYSTEM

[75] Inventors: Robert L. Rod, Marina Del Ray; Walter L. Penick, Jr., Culver City; Henry B. Heller, Pasadena, all of Calif.

[73] Assignee: Monogram Industries, Inc., Santa Monica, Calif.

[21] Appl. No.: 581,851

[22] Filed: May 29, 1975

[51] Int. Cl.² .......................... C02C 5/12; C02C 3/00
[52] U.S. Cl. ................................... 204/151; 204/149; 204/237; 204/260; 210/62; 210/63; 110/8 R
[58] Field of Search .................... 204/151, 149, 98, 99, 204/129, 100, 128, 260, 237; 110/8 R, 8 P; 201/21, 25, 37; 210/13, 63, 62, 152, 143, 149

[56] References Cited

U.S. PATENT DOCUMENTS

| 1,617,014 | 2/1927 | Derleth | 110/8 P |
| 1,842,296 | 1/1932 | Statham et al. | 204/260 |
| 1,892,681 | 1/1933 | Rankin | 110/8 R X |
| 2,660,966 | 12/1953 | Lyons | 110/8 R |
| 3,562,137 | 2/1971 | Gehring | 204/151 X |
| 3,582,485 | 6/1971 | Guter et al. | 204/149 |
| 3,684,703 | 8/1972 | Marmo | 210/13 |
| 3,706,662 | 12/1972 | Wellford, Jr. | 204/129 X |
| 3,756,933 | 9/1973 | Greenberg | 204/151 X |

FOREIGN PATENT DOCUMENTS

| 809,948 | 4/1969 | Canada | 110/8 R |

Primary Examiner—Arthur C. Prescott
Attorney, Agent, or Firm—Poms, Smith, Lande & Glenny

[57] ABSTRACT

A non-polluting wastewater evaporation disposal method and system wherein hydrogen gas is electrolytically produced from the wastewater, collected and used as a source of fuel to evaporate the wastewater to thereby convert the wastewater to a disinfected non-polluting sterile solid residue and water vapor. A halogen having an atomic number of between 16 and 54 may also be electrolytically produced from the wastewater and used to disinfect the wastewater.

12 Claims, 1 Drawing Figure

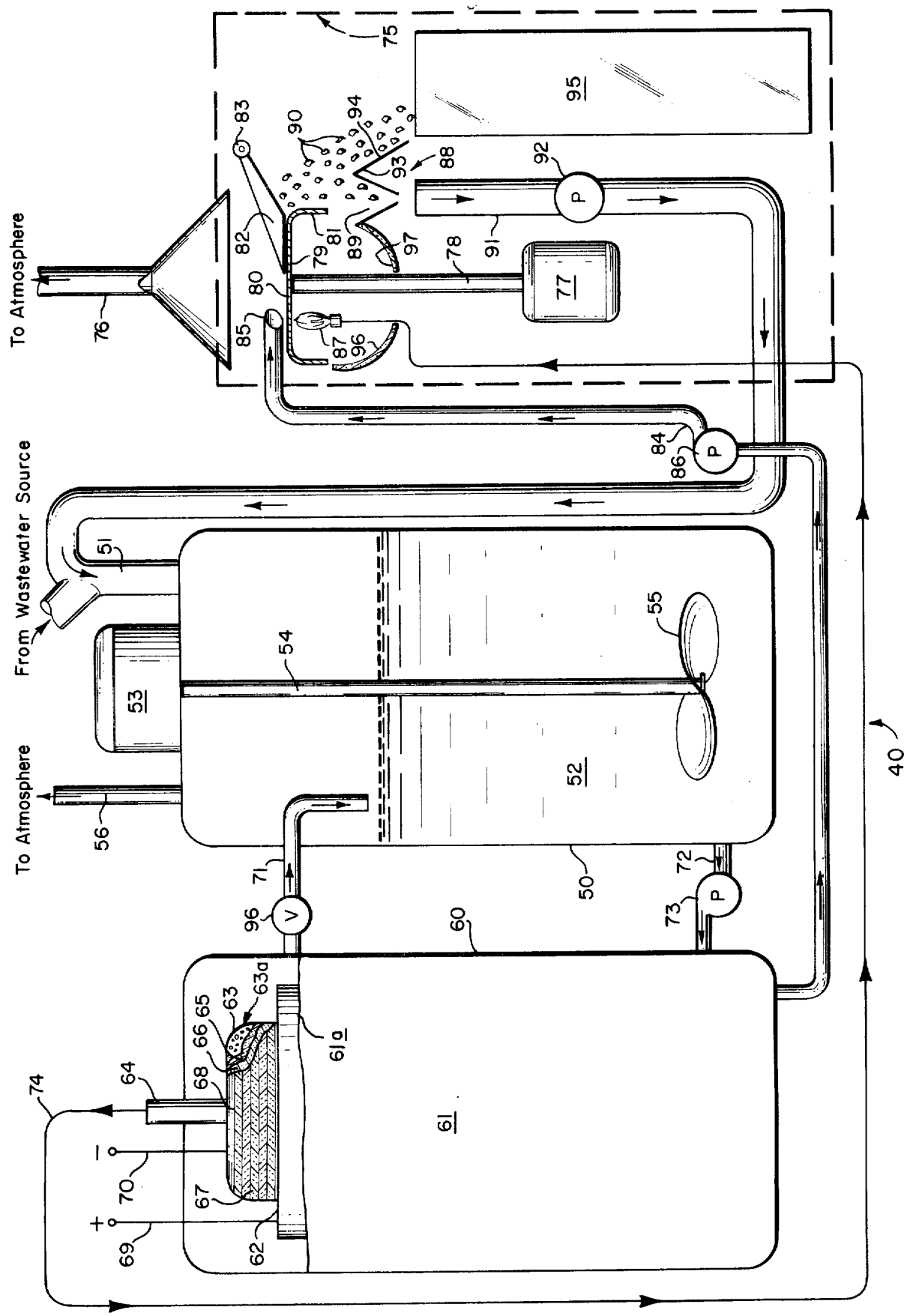

WASTE EVAPORATION DISPOSAL SYSTEM

BACKGROUND OF THE INVENTION

1. Field of the Invention

The invention relates to a non-polluting wastewater pyrolysis disposal system; and more particularly, to a system for converting wastewater to water vapor and a sterile solid residue.

2. Description of the Prior Art

The disposal of sewage sludge is a major problem throughout the entire world. Such sludge may be "septic sludge", such as that obtaining from septic tanks, or the sludge produced at conventional primary and secondary waste water treatment plants. Wastes ressembling sludge in strength produced in various waterless and limited water flushing toilets used on boats, trains, aircraft and in remote locations also pose a substantial disposal problem. Disposal techniques such as digestion, land fill, oxidation and the like are well-known in the art as partial answers to a difficult problem. What is needed is a technique for reducing the sludge to water vapor and inert solids.

The use of electrolysis in the partial treatment of sewage is well known and is the basis of numerous commercially available products. Typical systems are described for toilet systems by George C. Roberts, in U.S. application Ser. No. 490,347, assigned to Monogram Industries, Inc., and are discussed in great detail in the article entitled, SEWAGE ELECTROLYSIS, by Norman S. Wei and Gary W. Heinke of the University of Toronto, Canada, in the May 1974 issue of WATER AND POLLUTION CONTROL (Canadian). These systems depend upon the passage of a direct current through a liquid slurry of sewage to which a quantity of sodium chloride is added to increase the current and provide a useful supply of chlorine for sewage disinfection and odor removal through the accompanying oxidation process. Effluent is disinfected water which may still contain excessive pollutants preventing its subsequent disposal.

In most such systems, the simultaneous generation of hydrogen gas in the electrochemical reaction involved has been viewed with alarm, as hydrogen gas is dangerous, highly explosive and must be handled with care. In addition, an excessive amount of gas frothing of suspended solids in the wastes takes place where hydrogen is being formed.

The enormous problems in the treatment of sewage, such as human waste, can best be appreciated when considering the problem of disposing of human wastes in homes and establishments remote from conventional sewerage and septic tank systems. In such locations, where water for flushing conventional toilets is often in short supply, it is convenient in many cases to employ waterless flusing toilets such as those described by Rod et al. in U.S. Pat. No. 3,829,909 and others. In such toilets, the body wastes are collected free of the dilution of water otherwise used for flushing toilets and transporting the wastes to a disposition point.

As is well known, the body waste of an average male adult approximates 0.4 gallons a day of which 95% is water in urine and the remainder organic and inorganic materials of a wide variety. Of the 5% remainder, about half is in the form of dissolved materials; the other half being settleable and suspended solids. The waste output of women is less than that of men, while children produce even less. In total, the average family of four will thus produce slightly over 1 gallon of body wastes each day. Were this family to employ conventional water flush toilets using approximately 5 gallons of drinking water per use, statistics show the toilet would be used 7 times a day by each person or 28 times per day. At 5 gallons per flush, the total toilet waste would be 1 gallon or so of body waste intermingled with 140 gallons of toilet flushing water, all of which is heavily contaminated with noxious material and pathogenic organisms too numerous to list. The magnitude of the problem of handling ordinary sewage containing toilet flush water is further increased by the introduction of lightly polluted water from sinks, baths, showers and appliances that adds as much as 175 gallons of water per day to the already polluted sewage system.

It can be seen, therefore, that a system which reduces or eliminates the use of drinking-quality water for flushing will substantially reduce the quantity of wastewater and thus simplify its treatment and disposal.

In a copending application of Norris J. Bishton et al, entitled "Sewerless Recirculating Toilet and Human Waste Storage System", application Ser. No. 446,294, also assigned to Monogram Industries, Inc., a sewerless recirculating toilet and human waste storage system is disclosed wherein human waste products and an immiscible flushing fluid of a specific gravity less than water are received from a commode, the waste products are separated from the flushing fluid, and the separated waste products are stored indefinitely below a floating layer of separated flushing fluid, a portion of which is recycled back into the commode in a purified state for flushing the commode. The stored wastes are removed periodically and can be treated for recovery of inherent by-products or they may be transported to a remote treatment station and disposed.

In the latter case, an improved non-polluting wastewater incineration system for disposing of such human waste products in proximity of the commode would be desirable as an alternative to pump-out, transport and treatment at a remote point. The advantages of such a "sewerless" recirculating toilet and human waste storage system are discussed in detail in the copending application of Bishton et al. However, as discussed in the Bishton et al application, such system is not entirely self-centered.

SUMMARY OF THE INVENTION

It is an object of this invention to provide for a non-polluting wastewater evaporation disposal system and method for converting wastewater to a sterile solid residue or powder.

It is a further object of this invention to provide a system for converting wastewater to a sterile solid residue using chlorine generated in the system to disinfect the wastewater and using hydrogen gas generated in the system to evaporate the wastewater into the sterile solid residue.

It is still another object of this invention to provide a non-polluting system and method which can be used in conjunction with a recirculating toilet system to make such toilet systems entirely self-contained.

It is a still further object of this invention to provide such a system which collects unwanted and troublesome hydrogen gas produced in the system and utilize the produced hydrogen gas to evaporate the water in the wastewater and evaporate all noxious organic contaminants eliminating the problem of handling great quantities of water-bearing sludge or the like.

These and other objects are preferably accomplished by providing a non-polluting wastewater evaporation disposal system and method wherein the wastewater is converted to a sterile solid residue by producing hydrogen gas in an electrolytic cell and utilizing the produced hydrogen gas as a source of fuel to evaporate the wastewater to a sterile solid residue and water vapor. In addition, a halogen may be produced in the cell and the halogen used to disinfect the wastewater.

BRIEF DESCRIPTION OF THE DRAWING

The drawing is a diagrammatic view of the non-polluting wastewater evaporation disposal system and method of this invention.

DESCRIPTION OF THE PREFERRED EMBODIMENT

When used throughout this specification, the term "wastewater" is used to denote industrial and human waste. The term "wastewater" is defined and discussed in both "Wastewater Engineering", by Metcalf and Eddy, Inc., McGraw Hill Book Co., New York, New York, 1972 and "Environmental Engineering and Sanitation", 2nd Ed, by Joseph A. Salvato, Jr., John Wiley & Sons Inc., New York, N. Y., 1972, and in other textbooks on this subject.

As will be discussed further hereinbelow, the non-polluting wastewater evaporation disposal system and method of this invention may be used to treat any water received from conventional sewerage and septic tank systems. It may also be used at any sewage treatment plant to evaporate the waste at such plants. In addition, the invention described hereinbelow has particular application in the treatment and disposal of human waste products and is used to convert human body waste, toilet tissue, sanitary napkins, etc., into water vapor and an innocuous powder or sterile solid residue. The end products are safe to handle, the solid residue being completely odorless and sterile. Accordingly, the waste evaporation disposal process disclosed herein may be used in conjunction with the sewerless recirculating toilet and human waste storage system disclosed in the above-mentioned copending application of Bishton et al, the pertinent portions thereof being incorporated herein by reference. Further, such process is not limited to the system of Bishton et al, but may be used in any system to treat waste, such as in a limited water flush toilet system. For example, a recirculating toilet system in conjunction with which the techniques of this invention may be used is described in the aforementioned patent to Rod et al. Thus, when used to treat the waste of such systems, such systems may be rendered entirely self-contained. There would therefore be no necessity to transport such waste and treat it at a remote point.

Referring now to the drawing, a non-polluting wastewater evaporation disposal system 40 will now be described which may either be used to evaporate waste received from a recirculating toilet system such as the aforementioned systems of Rod et al and Bishton et al, or wastewater received from any sewerage treatment plant, toilet system, limited waste flush system, septic tank, etc. Thus, as shown in the drawing, system 40 includes a wastewater retention chamber 50, an electrolytic cell 60, and a evaporating structure 75. The wastewater retention chamber 50 includes a wastewater inlet 51 which is in fluid communication with the upper portion of chamber 50. Inlet 51 thus receives wastewater from any suitable source as heretofore described.

Further, chamber 50 may be eliminated and the wastewater brought directly into cell 60. Also, the cell 60 may form a part of chamber 50 with the wastewater introduced into cell 60 when desired. As can be seen in the drawing, wastewater 52 is disposed in tank 50. Means may be provided for both further macerating the wastewater 52 in tank 50 and mixing the wastewater 52 so that optimum contact is provided with the chlorine which will be introduced into tank 50 as will be discussed shortly. Thus, such means may include a motor 53, preferably disposed externally of tank 50 as at the top thereof, having a rotating shaft 54 extending down into tank 50 into communication with wastewater 52. Mixing and macerating blades 55 or the like may be carried along the shaft 54 for macerating the wastewater 52 and mixing it with the chlorine gas. A plurality of such blades 55 may be provided along shaft 54, if desired. A vent pipe 56 may communicate with the interior of tank 50, above wastewater 52, and vented to the atmosphere, for venting gases therefrom. In all the foregoing, and in the components to be hereinafter described, conventional bearings, gaskets, etc., may be provided to carry out the techniques of this invention.

Cell 60 may be a conventional diaphragm-type cell, such as those manufactured and sold by the Hooker Chemical Co. and known as Hooker-Type S cells, modified in accordance with the teachings of this invention. Such cells are used to form hydrogen gas at the cathode and chlorine at the anode (or anodes). The actual structure and composition of the cell 60 and its components is thus well known in the art. These cells are generally sealed from the atmosphere and initially charged with a concentrated chloride salt solution 61, such as sodium chloride. Cell 60 may have any suitable number of spaced anodes and cathodes (at least one of each) and, for purposes of this invention, may include a pair of spaced anodes 62 (only one visible in FIG. 6) separated by a single spaced cathode 63 disposed in solution 61. Cathode 63 has a hollow interior and includes a perforated steel body 63a, and a hydrogen gas outlet 64 communicating with the hollow interior thereof and extending out of the sealed cell 60 for removing hydrogen gas from cell 60. Preferably, cathode body 63a is covered with a porous diaphragm 65 such as asbestos 65, so that ions may pass into the interior of cathode 63 but no solid particles or gas (i.e., chlorine). However, wet asbestos is not very strong. Since circulation takes place in cell 60 at a relatively great pressure and heavy turbulence in carrying out the invention, the asbestos 65 is in turn covered by a coating 66 of a suitable permeable material, such as fiberglass fabric, which strengthens the asbestos and prevents the chlorine being formed at the anodes 62 from contacting the cathode. A plurality of spaced strips 67 of a suitable permeable material, such as fiberglass fabric, may be used to firmly bond coating 66 to asbestos 65. Of course, any suitable reinforcing material resistant to chlorine may be used. The hydrogen gas is formed between the asbestos 65 and the outer surface of the steel body 63a of the cathode 63 and passes through the perforations into the interior of cathode 63.

The top of hollow diaphragm cathode 63 may be sealed with an epoxy cap 68 with outlet 64 extending therethrough.

Thus, as is well known in diaphragm cells, chlorine is generated at anodes 62 with hydrogen gas formed within cathode 63 when a suitable source of current, via leads 69 and 70, is applied to anodes 62 and cathode 63, respectively. Of course, any suitable electrical power source may be used.

Further, although chlorine has been disclosed, any halogen-containing salt, such as sodium bromide or sodium iodide, may be used, the halogen having an atomic number of between 16 and 54. The resultant gas or halogen, such as chlorine, iodine, bromine, etc., is then used as will be discussed further in reference to chlorine.

A chlorine discharge outlet 71 is in fluid communication at one end with the upper portion of cell 60 (above the solution 61 therein) and at the other end with the interior of chamber 50, above the wastewater 52 therein. In this manner, chlorine formed in cell 60 is used to chlorinate the wastewater 52 in chamber 50 and cell 60, thus deodorizing and disinfecting the wastewater 52 therein. Blades 55, in addition to macerating the wastewater 52, mix the chlorine into contact with wastewater 52.

Thus, most of the free chlorine formed at the anodes 62 dissolves in the water in cell 60 to form hypochlorous acid and sodium hypochlorite because of the presence of sodium hydroxide which has been formed during the electrolytic reaction. What little free chlorine gas does not dissolve, escapes to the atmosphere via vent 56. That is, as the upper level 61a of solution 61 reaches outlet 71, it is discharged into chamber 50 as a mixture of sewage and water with the chlorine dissolved therein. Thus, the chlorine, in the form of hypochlorous acid, chlorinates the wastewater in chamber 50. Simultaneously, more hydrogen gas is being generated at cathode 63.

A wastewater outlet 72, controlled by a recirculating pump 73, is in fluid communication at one end with the wastewater 52 in chamber 50 and at the other end with the interior of cell 60. The wastewater 52 of course contains salts and this serves to continue the generation of hydrogen and chlorine within cell 60.

A hydrogen gas outlet 74 is in fluid communication at one end with the outlet 64 of cathode 63 (of course, this could be one continuous outlet) and at the other end with the interior of pyrolyzing structure 75.

Structure 75 includes a vent 76 to the atmosphere at the top thereof. A heat exchanger (not shown) may be associated with vent 76 and coupled to system 10 to preheat the flushing fluid, if desired. A motor 77 is mounted within chamber 75 and includes an upwardly extending shaft 78 carrying a platen 79 at its upper end. Shaft 78 may be of any suitable material, such as ceramic material. Platen 79 includes a generally flat upper surface 80 having downwardly turned edges 81. A scraper blade 82 is fixedly secured at end 83 to chamber 70 and extends over platen 79 so as to scrape the surface 80 thereof as platen 79 rotates. Of course, blade 82 may be rotated in any suitable manner with platen 79 remaining stationary.

A wastewater outlet line 84 is in fluid communication at one end with cell 60 (of course, line 84 may also be used to pump the wastewater 52 out of chamber 50, if desired) and at the other end extends into the interior of evaporating structure 75 terminating at end 85 which opens at a point above the upper surface 80 of platen 79. End 85 may be flared or the like, if desired, or otherwise formed to distribute the wastewater at some desired point on surface 80. At least some portion of line 84, such as end 85, may be of a suitable heat-resistant glass material, such as pyrex or quartz. Outlet line 84 is controlled by a pump 86, which may also be a macerating pump, so that the wastewater 52 may be pumped from cell 60 (or chamber 50) to structure 75.

Hydrogen gas outlet 74, as discussed previously, extends into the interior of evaporating structure 75 and terminates at a point directly beneath platen 79 forming a flame 87. Any suitable means may be used for continually burning the hydrogen gas as it exits from outlet 74, such as a catalytic igniter (not shown) or piezo-electric igniter (not shown) which would automatically shut off the flow of hydrogen from outlet 74 should flame 87 go out.

Pyrolyzing or evaporating structure 75 may further include ash diverting means for diverting a portion of the solid residue being formed at platen 79 back to chamber 50. This may be accomplished by providing a divider 88 mounted in chamber 75 forming a first V-shaped portion 89 opening upwardly to divert a portion of the solid residue (i.e., particles 90) through a conduit 91 opening into wastewater inlet 51. A suitable pump 92 disposed in conduit 91 may be used to accomplish this. Divider 88 further includes a second inverted V-shaped portion 93 integral with portion 89 forming a slope 94 down which particles 90 may pass into a suitable container 95. In this manner, a predetermined amount of the solid residue being formed, which is high in chloride salts, as for example, between one-half and one-third of the total residue being produced, may be diverted back into the chamber 50 to provide the salts necessary to carry out the electrolytic reaction in cell 60. Of course, any suitable diverting means may be used that may occur to an artisan.

One or more parabolic reflectors, such as reflectors 96 and 97, may be so mounted in structure 75 to focus the heat from flame 87 at one particular point on platen 79. Obviously any suitable reflecting means may be used.

In operation, the pump 86 is activated to pump very slowly with respect to pump 73, as for example, 1 cc/min. for pump 86 and 1 liter/min. for pump 73. This enables the chlorine produced in cell 60 to get back into chamber 50 in a manner maintaining the desired level of electrolyte in cell 60.

Motor 53 is activated to both macerate the structure 52 and distribute the chlorine throughout. Motor 53 may also be keyed to pump 73 to so operate pump 73 simultaneously, if desired. In cell 60, electricity is supplied to anodes 62 and cathode 63 and hydrogen gas is generated inside of the hollow cathode. The saturated salt water in cell 60 pushes on cathode 63 creating an appreciable amount of water pressure thereon. Thus, it is necessary to protect the cathode 63 as discussed hereinabove.

The hydrogen gas being generated is removed from cathode 63 via outlets 64 and 74 and continually burned at flame 87. Chlorine flows via outlet 71 back into chamber 50. Motor 77 is also activated to rotate platen 79. The wastewater 52 discharging onto the upper surface 80 of platen 70 is immediately converted to a sterile solid residue, water vapors exiting out of vent 76. Of course, these water vapors may also be recovered, if desired. A heat exchanger (not shown) thus may also be associated with the wastewater 52 entering cell 75. The residue 90 falls onto divider 88 where a portion thereof is diverted, via diverter portion 89, through conduit 91 back into chamber 50. Pump 92, which may be a conventional flexible screw conveyor, may be activated to accomplish this. The remaining residue is captured in container 95 where it may be subsequently removed or otherwise treated to recover by-products therefrom, if desired.

Reflectors 96 and 97 may be used to increase the intensity of the heat source (or the intensity of flame 87 itself may be varied) as by making such reflectors movable. The rate of flow of the wastewater 52 to platen 79 may also be varied via pump 86. In this manner, the pyrolysis or evaporation disposal system of FIG. 6 may be used to completely and quickly convert the wastewater to a sterile solid residue.

This system generates an excess of chlorine. Optionally, therefore, if desired, such excess chlorine may be recovered, as for example in the form of sodium hypochlorite or hypochlorous acid, by use of a three-way valve 96 in outlet 71 stored or other wise used, such as to chlorinate a swimming pool, treat grey water (i.e., the water used in basins, showers, bathtubs, etc.), etc. Also, some of the heat produced at flame 87 or waste heat otherwise lost up vent 76 may be applied to a heat exchanger (not shown) and used to preheat and wastewater outlet 84, if desired. Suitable valves and controls may also be used where desired, such as at outlet 64, the use and operation thereof being well known to the artisan.

In summary, chlorine and hydrogen gas are developed at electrodes separated from one another and the chlorine and hydrogen gas are used for different purposes. The chlorine may be used conventionally to chlorinate and disinfect the wastewater and eliminate both odor and color, while the hydrogen gas may be either temporarily stored in a gas holder or used continually as a fuel in the second and following evaporative stage.

The second evaporative stage is a heated platen 79 that rotates above an open flame of the hydrogen gas. The disinfected and macerated wastewater is dropped onto the top surface 80 of the rotating platen 79 whereupon the water portion evaporates into steam leaving an inert solid residue removed by a scraping blade 82. The residue may be collected in any suitable container 95, such as a disposable paper bag or other receptacle.

Thus, hydrogen gas generated in the system is kept separate from the waste solution during the electrolysis stage and conducted to a second stage where it is burned. Simultaneously, the sterilized waste solution is conducted to the second state (and macerated either before or after the first stage) and evaporated and/or purified with the hydrogen flame. Some of the residue resulting from the second stage may be recycled to the first stage since it contains a high proportion of chloride salts.

The hydrogen gas which was a waste product in earlier prior art processes is now used to burn the disinfected wastewater. Also, separating the hydrogen gas avoids the explosion and frothing problem known in the prior art. In addition, to generate sufficient hydrogen gas, it is necessary to generate a substantial excess of chlorine, for example, eight times the required amount. Such excess of chlorine insures there is no odor problem and may be used for other applications, such as chlorinating gray water and/or to chlorinate a swimming pool.

The system disclosed hereinabove has significant applications in toilet systems where a limited amount of flushing water or non-aqueous flushing fluid is present and thus the output is basically waterless. It may be used in conjunction with such toilet systems, as heretofore disclosed, to make them entirely self-contained. Thus, in situ sanitation using the system herein disclosed in conjunction with prior toilet systems is feasible.

The salts necessary to carry out the electrolytic reaction in cell 60 may either be added to cell 60 or already present in wastewater 52. The halogen produced disinfects the wastewater and may be diverted to the wastewater prior to entry into cell 60, once the electrolytic reaction begins, to predisinfect the wastewater. This added halogen increases the current flow in cell 60 which in turn increases the production of hydrogen gas.

Wastewater from any source thus may be disposed in situ using the foregoing techniques of our invention. Although a preferred arrangement has been shown and described in the drawing, obviously various arrangements may occur to the artisan and the invention should be limited only to the appended claims.

We claim as our invention:

1. A non-polluting method for disposing of wastewater comprising:
    bringing said wastewater into a liquid-retaining cell having an anode and cathode therein and into contact with an anode and cathode.
    passing an electric current through said wastewater in said cell and between said anode and cathode thereby producing hydrogen gas at the cathode and a halogen at said anode;
    keeping the hydrogen gas separate from the chlorine gas;
    bringing said halogen into intimate contact with said wastewater in said cell to disinfect and said wastewater;
    collecting said hydrogen gas;
    removing said wastewater after contact with said halogen from said cell; and
    evaporating said wastewater using said collected hydrogen gas as a source of fuel to convert the removed wastewater from said cell into disinfected non-polluting sterile solid residue and water vapor.

2. In the method of claim 1 wherein said wastewater contains a halogen-containing salt, the halogen having an atomic number of between 16 and 54, said method further comprising the step of producing the same halogen as in said salt at said cathode.

3. In the method of claim 1 including the step of adding a halogen-containing salt, the halogen having an atomic number of between 16 and 54, to said wastewater prior to passing said electric current through said wastewater.

4. In the method of claim 3 including the step of producing the same halogen as in said salt at said anode.

5. A non-polluting method for disposing of the output of waste matter discharged from a recirculating toilet system using as a flushing medium a recirculating flushing fluid, the method comprising the steps of:
    bringing said waste matter into contact with an anode and a cathode in a liquid-retaining cell;
    passing an electric current through said waste matter and between said anode and cathode thereby producing hydrogen gas at the cathode and a halogen at said anode;
    collecting said produced hydrogen gas;
    bringing said waste matter in said cell into intimate contact with said halogen produced at said anode to disinfect said waste matter;
    removing said waste matter from said cell after contact with said halogen; and
    evaporating said wastewater using said collected hydrogen gas as a source of fuel to convert the removed waste matter into disinfected non-polluting sterile solid residue and water vapor.

6. In the method of claim 5 including the step of adding a halogen-containing salt, the halogen having an atomic number of between 16 and 54, to said waste matter prior to the step of passing an electric current therethrough thereby producing the same halogen as in said salt at said anode.

7. A non-polluting method for disposing of wastewater containing a halogen-containing salt, the halogen having an atomic number of between 16 and 54, to a sterile solid residue and water vapor comprising the steps of:
 electrolytically producing a halogen and hydrogen gas in a halogen salt containing cell and preventing said hydrogen gas from contacting said halogen;
 mixing said produced halogen in situ with said wastewater to disinfect said wastewater;
 collecting said hydrogen gas;
 burning said hydrogen gas; and
 purifying said wastewater after mixing with said halogen until said wastewater is converted to both a sterile solid residue and water vapor using the burning hydrogen gas as a source of fuel.

8. The method of claim 7 wherein the step of disinfecting said wastewater includes the step of agitating said wastewater while adding said halogen thereto thereby macerating said wastewater and mixing said halogen into contact therewith.

9. The method of claim 7 wherein the step of producing halogen and hydrogen gas includes the steps of:
 bringing said wastewater into an electrolytic cell having at least one anode and one hollow cathode therein;
 sealing said hollow cathode from entry of solid and gas particles into the interior thereof;
 bringing said wastewater into contact with said anode and said cathode;
 applying an electrical current to said anode and said cathode; and
 forming halogen in said cell while limiting hydrogen gas to the interior of said cathode.

10. The method of claim 7 wherein the step of burning said hydrogen gas includes the step of continuously burning said hydrogen gas.

11. The method of claim 7 wherein the step of pyrolyzing said wastewater includes the step of diverting at least a portion of said solid residue back into contact with said wastewater prior to producing said halogen and hydrogen gas.

12. The method of claim 7 including the step of focusing the heat of said burning hydrogen gas into contact with said wastewater.

* * * * *